C. HUBERT.

CLOSURE FOR VESSELS.

APPLICATION FILED MAY 8, 1909.

Reissued June 15, 1909. 12,974.

Witnesses:
Louis Ashley Kelly
Victor D. Bond

Inventor:
Conrad Hubert
by Henry D. Williams
Attorney.

UNITED STATES PATENT OFFICE.

CONRAD HUBERT, OF NEW YORK, N. Y.

CLOSURE FOR VESSELS.

No. 12,974. Specification of Reissued Letters Patent. Reissued June 15, 1909.

Original No. 891,696, dated June 23, 1908, Serial No. 424,525. Application for reissue filed May 8, 1909. Serial No. 494,937.

*To all whom it may concern:*

Be it known that I, CONRAD HUBERT, a citizen of the United States, residing at the borough of Manhattan, city of New York, in the county of New York and State of New York, have invented a certain new and useful Improvement in Closures for Vessels, of which the following is a specification, reference being had therein to the accompanying drawings, forming part thereof.

My invention relates generally to closures for vessels and relates particularly to closures for bottles or flasks which in use are exposed to jars and vibrations, for example, vessels for containing liquid food and beverages to be carried on rapidly moving vehicles, such as automobiles.

The principal objects of my invention are to prevent the closure of such a vessel from becoming loosened by jars and vibrations, and to provide a closure having a neat and finished appearance.

There are also other objects and advantageous features which will appear from the following description.

Difficulty has been found in providing a closure for vessels which will remain tight when the vessels are subjected to vibration, especially in use on automobiles. This difficulty has been particularly acute in reference to heat insulating vessels that are adapted to preserve their contents in a hot or in a cold condition for long periods, as the slightest loosening of the closure permits the passage of heat, and when the contents are hot there is an internal pressure which tends to open the closure. My invention is directed to overcoming these difficulties, and to these ends my invention includes a stopper fitting into the neck or mouth of the vessel and provided outwardly with two telescoping members within which is a thrust spring adapted to act throughout a considerable range of movement, the whole forming a closure which is adapted to coöperate with the usual outer cap of the vessel.

I will now describe my invention with reference to the accompanying drawings and will thereafter point out my invention in claims.

Figure 3:
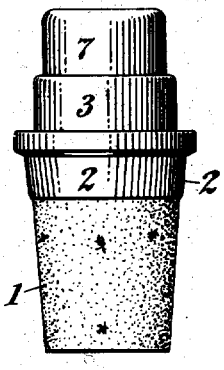
Figure 1:
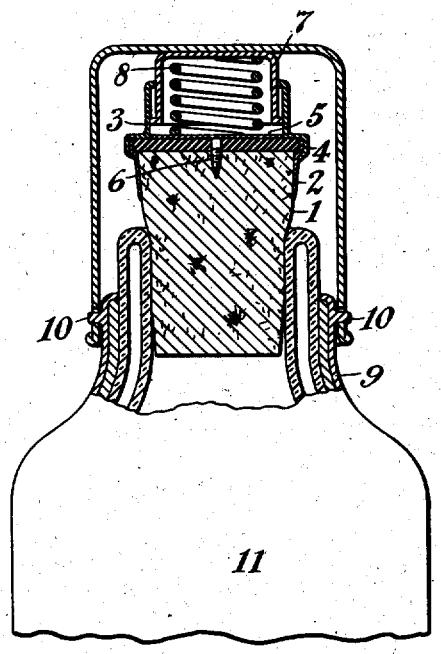
Figure 4:
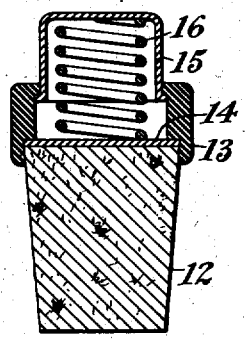
Figure 2:
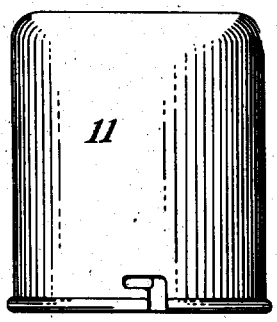
Figure 5:
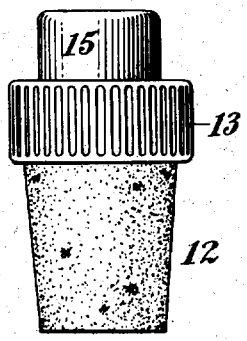

Figure 1 is a part elevation and part central vertical section of a portion of a heat insulating vessel embodying the closure of my invention. Fig. 2 is an elevation of the cover cap removed from the vessel. Fig. 3 is an elevation of the vessel closure removed from the vessel. Fig. 4 is a central vertical section of a modified form of vessel closure. Fig. 5 is an elevation of the same.

In the embodiment of my invention illustrated in the drawings a tapered stopper 1 of yielding resilient material, for example, of cork, as indicated in the drawings, is secured at its upper and larger end in a metal annulus 2 which surrounds and firmly grips the upper portion of the stopper 1, in manufacture the tapered stopper being forced down through the annulus. The annulus 2 extends above the top of the stopper 1 and is enlarged into a flange portion forming annular inner and outer shoulders, the inner shoulder being substantially flush with the top of the stopper 1. An annular metal socket 3 is provided at its bottom with an enlarged portion or flange portion telescoping over the enlarged portion of the annulus 2 and clenched or spun down under the outer shoulder of the annulus to firmly secure together the socket and the annulus. The socket 3 is contracted above the annulus to form an internal annular shoulder opposed to the internal shoulder on the annulus 2. A disk 4 of any suitable material harder and firmer than the stopper 1, for example, indurated fiber or compressed paper, is seated in the annular groove formed between the shoulders of the annulus 2 and the socket 3 immediately above the stopper 1, and a metal washer 5 overlies the disk 4 and fits in the contracted portion of the socket 3. The disk 4 and the washer 5 are secured to the stopper 1, the securing means being shown as a screw 6. The disk 4, because of the fact that it is seated in the groove formed by the peripheral enlargements of the annulus and the socket, greatly assists in holding the stopper in place in the annulus.

A cup-shaped metal cap 7 telescopes in the socket 3 and is retained therein by coacting annular flanges at the top of the socket 3 and at the bottom of the cap 7, as shown in the drawings, and the telescoping movement is limited by such flanges and by the washer 5, the extent of such telescoping movement, however, being of considerable range, as may be seen in Fig. 1. The cap or cup 7 and the stopper 1 are constantly thrust away from each other, the cap 7 being thrust toward its extended position in relation to the annular socket 3, by a coiled thrust spring 8 located within the cap 7 and socket 3, and acting between the top of the cap 7 and the washer 5. The lower end of the spring 8 is secured to the washer 5, by soldering, as indicated in Fig. 1, or by other suitable means, so that the spring 8 is centered relatively to the stopper 1 and also is conveniently supported by the stopper during assembling of the device. The spring 8 has some initial tension and is stiff enough to fully serve its function of preventing the stopper 1 from working out of the mouth or neck of the vessel. The peripheral enlargement provides a firm finger hold in inserting or removing the closure from the vessel.

In using the closure the stopper portion 1 is adapted to be inserted into the mouth of the vessel to a variable extent, that is, to a greater or less extent or degree, in the same manner in this respect as an ordinary cork, and should the stopper portion become somewhat permanently compressed or reduced in diameter by long continued use it may then be inserted to a greater extent to still secure a tight fit.

Vessels of the class to which the closure of my invention is intended and adapted to be applied are provided, in addition to the corks or other closures proper, with outer cover-caps which are detachably retained in any convenient manner in fixed position over the mouths of the vessels, such a cover-cap usually forming part of an outer protective sheath for the vessel. The closure of my invention is adapted to be retained in a fluid-tight and air-tight manner in the mouth of the vessel by such a cover-cap, and is so maintained regardless, within certain limits, of the extent of insertion of the closure into the mouth or neck of the vessel, and such air-tight and fluid-tight fit is maintained in spite of jolts, jars or vibrations to which the vessel is subjected and which would cause an ordinary cork to work out and become loose.

In the drawings the closure of my invention is shown as applied to a heat insulating vessel having spaced walls inclosing a vacuum jacket, as well known in the art, the upper portion only of such vessel being shown. This vessel is shown as provided with a protective covering, including an outer metal sheath 9. The sheath 9, near its upper edge, is provided with diametrically opposite lugs 10, for retaining in place a metal cover-cap 11, which is provided at its lower edge with bayonet slots, as shown most clearly in Fig. 2, for receiving such lugs.

In use it is only necessary to insert the closure into the vessel until it is tight, in the same manner that an ordinary cork would be inserted, then when the outer cap or cover-cap 11 is applied to the vessel its closed top will press downward or inward on the inner cap or cup 7 and the thrust spring 8 will firmly and securely hold the stopper 1 in its tight position in the neck of the vessel, the strength and tension of this spring being sufficient to effectually counteract any internal pressure and any loosening tendencies of jars or vibration to which the vessel may be subjected. When the protective and closure-retaining cover-cap 11 is removed, the closure presents a neat, attractive and finished appearance, and maintains the sealed condition of the vessel until the closure is intentionally removed, and the closure may be removed and inserted in the same manner as an ordinary cork.

In the modification of my invention illustrated in Figs. 4 and 5 a tapered stopper 12, of yielding resilient material similar to the stopper 1, is provided and is fixed at its upper and larger end with cement or in any suitable manner, in an annular socket 13 of firmer and harder material, for example, hard rubber, the socket 13 being provided with a shoulder for assisting in fixing the stopper 1. A washer 14, which may be of any suitable material, is shown as interposed between the shoulder of the socket 13 and the top of the stopper 12. A metal cap 15, similar to the cap 7, telescopes in the socket 13 and is retained therein by coacting annular flanges at the top of the socket 13 and at the bottom of the cap 15, the telescoping movement of the cap 15 being limited by such flanges and by the washer 14. The cap 15 and the stopper 12 are constantly pressed apart or pushed away from each other by a coiled thrust spring 16 within the cap 15 and socket 13 and acting between the top of the cap 15 and the washer 14. The annular socket 13 is provided outwardly around its circumference or periphery with milling (Fig. 5) which provides a secure finger hold in inserting or removing the closure from the vessel.

The manner of operation of the modified construction shown in Figs. 4 and 5 is substantially the same as of the construction shown in Figs. 1 and 3, and in fact this modified closure could be substituted for the closure shown in combination with the vessel in Fig. 1.

It is obvious that various modifications may be made in the construction shown and above particularly described within the principle and scope of my invention.

I claim:

1. A closure for vessels comprising a yielding stopper adapted to be inserted in the mouth of the vessel, a socket supported by the upper end of the stopper, a cap mounted for a limited telescopic movement relatively to the socket, and a coiled thrust spring in the cap acting between the cap and the stopper to press the cap away from the stopper.

2. A closure for vessels comprising a yielding stopper adapted to be inserted in the mouth of the vessel, a socket supported by the upper end of the stopper, a cap mounted for a limited telescopic movement relatively to the socket, and a coiled thrust spring in the cap acting to move apart the cap and the stopper; in combination with a vessel and a part for engaging the cap to maintain the stopper in air-tight and fluid-tight relation to the mouth of the vessel.

3. A closure for vessels comprising a yielding resilient stopper of tapered form adapted to be inserted in the mouth of the vessel, an annulus of harder material in which the upper end of the stopper is seated, a socket in which the upper end of the annulus is fixed, a cap having limited telescoping movement in the socket, and a coiled thrust spring inside of the cap and socket and acting between the top of the cap and the stopper.

4. A closure for vessels comprising a yielding resilient stopper of tapering form adapted to be inserted in the mouth of the vessel to a variable extent, an annulus of harder material in which the upper end of the stopper is seated, a socket in which the upper end of the annulus is fixed, a cap having limited telescoping movement in the socket, and a coiled thrust spring inside of the cap and socket and acting between the top of the cap and the stopper; in combination with a vessel and means for pressing downward on the cap to retain the stopper in its air-tight position in the mouth of the vessel.

5. A closure for vessels comprising a yielding resilient stopper of tapering form, an annulus in which the upper end of the stopper is seated, a socket, the annulus and the socket being provided with interlocking flanges for connecting together the annulus and the socket, a cup-shaped cap telescoping in the upper part of the socket, the cap and the socket being provided with coacting annular flanges for retaining the cap in the socket and for limiting its telescoping movement therein, and a coiled thrust spring within the cap and socket and acting between the top of the cap and the stopper.

6. A closure for vessels comprising a yielding resilient stopper of tapering form, an annulus in which the upper end of the stopper is seated, a socket, the annulus and socket being provided with interlocking flanges for connecting together the annulus and the socket, a cup-shaped cap telescoping in the upper part of the socket, the cap and the socket being provided with coacting annular flanges for retaining the cap in the socket and for limiting its telescoping movement therein, and a coiled thrust spring within the cap and socket and acting between the top of the cap and the stopper; in combination with a vessel and a detachable cover-cap adapted to press upon the top of the cap to hold the stopper in sealing relation to the mouth of the vessel.

7. A closure for vessels comprising a yielding resilient stopper of tapered form adapted to be inserted in the mouth of the vessel, an annulus surrounding and gripping the upper end of the stopper, a socket secured to the upper end of the annulus, a cap mounted for limited telescopic movement relatively to the socket, and a coiled thrust spring within the cap and adapted to press apart the cap and the stopper.

8. A closure for vessels comprising a yielding resilient stopper of tapered form adapted to be inserted in the mouth of the vessel, an annulus surrounding and gripping the upper end of the stopper, a socket secured to the upper end of the annulus, a cap mounted for limited telescopic movement relatively to the socket, and a coiled thrust spring within the cap and adapted to press apart the cap and the stopper; in combination with a vessel and means for pressing downward on the cap to retain the stopper in sealing position in the mouth of the vessel.

9. A closure for vessels comprising a yielding resilient stopper of tapering form, an annulus surrounding and gripping the upper end of the stopper, a socket secured to the upper end of the annulus, the socket having a shoulder therein for retaining the stopper in the annulus, a cap having limited telescopic movement in the socket, and a coiled thrust spring within the cap and adapted to push apart the cap and the stopper.

10. A closure for vessels comprising a yielding resilient stopper of tapering form, an annulus in which the upper end of the stopper is seated, a socket to which the upper end of the annulus is secured, the socket and the annulus being provided with peripheral enlargements forming an interior annular groove, a disk seated in the groove and secured to the stopper to retain the stopper in the annulus, a cap having limited telescopic movement in the upper part of the socket, and a thrust spring within the cap and adapted to push apart the cap and the stopper.

11. A closure for vessels comprising a yielding resilient stopper adapted to be inserted in the mouth of the vessel, a socket at the upper end of the stopper and provided with a shoulder limiting the entrance of the stopper into the socket, a cap telescoping in the upper part of the socket, and a coiled thrust spring within the cap and adapted to push apart the cap and the stopper.

12. A closure for vessels comprising a yielding resilient stopper adapted to be inserted in the mouth of the vessel, a socket at the upper end of the stopper and provided with a shoulder limiting the entrance of the stopper into the socket, a cap telescoping in the upper part of the socket, and a coiled thrust spring within the cap and adapted to push apart the cap and the stopper; in combination with a vessel and means for pressing downward on the cap to retain the stopper in sealing position in the mouth of the vessel.

13. A closure for vessels comprising a yielding resilient stopper adapted to be inserted in the mouth of the vessel, a socket at the upper end of the stopper and provided with a shoulder limiting the entrance of the stopper into the socket, a disk interposed between the stopper and the shoulder, a cap telescoping in the upper part of the socket, and a coiled thrust spring in the cap between the top of the cap and the disk and adapted to push apart the cap and the stopper.

14. A closure for vessels comprising a yielding resilient stopper adapted to be inserted in the mouth of the vessel, a socket at the upper end of the stopper and provided with a shoulder limiting the entrance of the stopper into the socket, a disk interposed between the stopper and the shoulder, a cap telescoping in the upper part of the socket, and a coiled thrust spring in the cap between the top of the cap and the disk and adapted to push apart the cap and the stopper; in combination with a vessel and means for pressing downward on the cap to retain the stopper in sealing position in the mouth of the vessel.

15. A closure for vessels comprising a yielding resilient stopper of tapering form, an annulus in which the upper end of the stopper is secured, a socket to which the upper end of the annulus is secured, a cap having limited telescopic movement in the upper part of the socket, a coiled thrust spring within the cap and adapted to push apart the cap and the stopper, and a washer below the spring and secured to the spring and secured to the stopper.

16. A closure for vessels comprising a yielding resilient stopper of tapering form, an annulus in which the upper end of the stopper is secured, a socket to which the upper end of the annulus is secured, a cap having limited telescopic movement in the upper part of the socket, a coiled thrust spring within the cap and adapted to push apart the cap and the stopper, and a washer below the spring and secured to the spring and secured to the stopper; in combination with a vessel and means for pressing downward on the cap to retain the stopper in sealing position in the mouth of the vessel.

17. A closure for vessels comprising a yielding resilient stopper of tapered form adapted to be inserted in the mouth of the vessel, a metal annulus surrounding and gripping the upper end of the stopper, the annulus having an enlarged portion extending above the stopper and forming an internal annular shoulder, a metal socket having at its bottom an enlarged portion secured to the enlarged portion of the annulus and forming an internal shoulder opposed to the shoulder of the annulus, a disk composed of harder material than the stopper interposed between the shoulders, a metal washer above the disk, a coiled thrust spring secured to the washer and acting between the top of the cap and the washer to push apart the cap and the stopper, and means for securing the washer and the disk to the stopper, whereby the stopper is secured in the annulus and the spring retained in position relatively to the stopper.

18. A closure for vessels comprising a yielding resilient stopper of tapered form adapted to be inserted in the mouth of the vessel, a metal annulus surrounding and gripping the upper end of the stopper, the annulus having an enlarged portion extending above the stopper and forming an internal annular shoulder, a metal socket having at its bottom an enlarged portion secured to the enlarged portion of the annulus and forming an internal shoulder opposed to the shoulder of the annulus, a disk composed of harder material than the stopper interposed between the shoulders, a metal washer above the disk, a coiled thrust spring secured to the washer and acting between the top of the cap and the washer to push apart the cap and the stopper, and means for securing the washer and the disk to the stopper; in combination with a vessel and means for pressing downward on the cap to retain the stopper in sealing position in the mouth of the vessel.

19. A closure for vessels comprising a yielding resilient stopper of tapering form, an annulus in which the upper end of the stopper is seated, a socket to which the upper end of the annulus is secured, the socket and the annulus being provided with peripheral enlargements forming an interior annular groove, a disk seated in the groove and secured to the stopper to retain the stopper in the annulus, a cap having limited telescopic movement in the upper part of the socket, and a thrust spring within the cap and adapted to push apart the cap and the stopper; in combination with a vessel and a detachable cover-cap adapted to press upon the top of the cap to retain the stopper in sealing position in the mouth of the vessel.

20. A closure for vessels comprising a stopper for closing the mouth of the vessel, a socket supported by the upper end of the stopper, a cap mounted for limited telescopic movement relatively to the socket, and a spring acting between the cap and the stopper to press the cap away from the stopper.

21. A closure for vessels comprising a stopper for closing the mouth of the vessel, a socket supported by the upper end of the stopper, a cap mounted for limited telescopic movement relatively to the socket, and a spring acting between the cap and the stopper to press the cap away from the stopper; in combination with a vessel and means forming an abutment above the telescopic cap and adapted to be secured to the mouth of the vessel.

22. A closure for vessels comprising a stopper adapted to close the mouth of the vessel, an annulus receiving the upper end of the stopper, a socket carried by the upper end of the annulus, a cap mounted for limited telescopic movement relatively to the socket, and a spring adapted to push apart the cap and the stopper.

23. In combination, a vessel, a stopper for closing the mouth of the vessel, a detachable cover-cap for the vessel exterior to the stopper, a socket carried by the upper end of the stopper, an inner cap having limited telescopic movement relatively to the socket and adapted to be pressed inward by the cover-cap, and a spring adapted to push the inner cap outward and the stopper inward.

In testimony whereof I have affixed my signature in presence of two witnesses.

CONRAD HUBERT.

Witnesses:

JOHN W. WALLER,

HARRY LEWIS.